United States Patent [19]

Cordner et al.

[11] 4,252,035
[45] Feb. 24, 1981

[54] INTEGRATED DRIVE-GENERATOR SYSTEM

[75] Inventors: Michael A. Cordner; Wayne A. Flygare; Duane H. Grimm, all of Rockford, Ill.

[73] Assignee: Sundstrand Corporation, Rockford, Ill.

[21] Appl. No.: 932,808

[22] Filed: Aug. 11, 1978

[51] Int. Cl.³ .............................................. F16H 47/04
[52] U.S. Cl. ........................................ 74/687; 74/730
[58] Field of Search .......................... 74/687, 730, 731

[56] References Cited

U.S. PATENT DOCUMENTS

| | | | |
|---|---|---|---|
| 2,452,704 | 11/1948 | Wahlmark | 98/1.5 |
| 2,474,706 | 6/1948 | Wahlmark | 60/53 |
| 2,803,112 | 8/1957 | Sadler, Jr. et al. | 60/53 |
| 3,004,450 | 10/1961 | Garnier | 74/687 |
| 3,298,250 | 1/1967 | Moss et al. | 74/675 |
| 3,365,981 | 1/1968 | Gantzer | 74/687 |
| 3,489,035 | 1/1970 | Giles | 74/687 |
| 3,576,143 | 4/1971 | Baits | 74/687 |
| 3,786,696 | 1/1974 | Aleem | 74/687 |

FOREIGN PATENT DOCUMENTS

| | | |
|---|---|---|
| 160125 | 8/1957 | Sweden . |
| 734530 | 8/1955 | United Kingdom . |
| 946940 | 1/1964 | United Kingdom . |
| 1184724 | 3/1970 | United Kingdom . |

Primary Examiner—Kenneth Downey
Attorney, Agent, or Firm—Wegner, Stellman, McCord, Wood & Dalton

[57] ABSTRACT

An integrated drive-generator system having a drive input shaft with a mechanical differential positioned in coaxial relation with the drive input shaft, a generator positioned alongside said differential and drive input shaft, and a hydrostatic transmission having a pair of coaxial hydraulically interconnected units positioned alongside said differential and drive input shaft and circumferentially spaced from said generator. A pair of drive connections to said differential are at one end of said hydrostatic transmission and the generator is drivingly connected to another element of the differential and with all of the interconnecting drive elements being located in a generally planar relation at the top of a housing for the system.

11 Claims, 2 Drawing Figures

INTEGRATED DRIVE-GENERATOR SYSTEM

BACKGROUND OF THE INVENTION

This invention pertains to an integrated drivegenerator system as usable in aircraft wherein an aircraft engine is used as a power source for an electrical generating system for the aircraft.

In the conventional system, a drive shaft connectable to an output shaft driven by an aircraft engine is connected to a mechanical differential, with the differential having an output connected to drive the generator. A variable speed transmission, such as a hydrostatic transmission, is associated with the mechanical differential and controlled to modify the output of the differential, as required, whereby the input speed to the generator remains constant even though the speed of the drive shaft may vary. Previous systems have incorporated a differential that spanned the length of the units of the hydrostatic transmission resulting in longer length shafting and has required accessory drive jack shafts.

Examples of prior art systems are shown in a number of patents owned by the assignee of this application, including Baits U.S. Pat. No. 3,576,143 and Aleem U.S. Pat. No. 3,786,696. These patents show a variety of structural arrangements for a constant speed drive and generator system, but which have the components structurally related to require a longer length unit and a total package having a corresponding weight disadvantage.

SUMMARY OF THE INVENTION

A primary feature of the invention disclosed herein is to provide a new integrated drive generator system structure and which has new and improved size, weight, and mounting characteristics.

The integrated drive generator system has a mechanical differential coaxially aligned with a drive shaft with a variable speed transmission, such as a hydrostatic transmission, alongside the differential and drive shaft and a generator also alongside said differential and drive shaft and circumferentially spaced from the transmission. Drive connections between the differential and the transmission and generator all lie in a fairly narrow gear plane.

More specifically, the variable speed transmission is a hydrostatic transmission with a pair of coaxial units hydraulically connected and with each of the units having a gear connection to the differential including a pair of gears associated one with each of a pair of shafts connected to their respective units and with both of the gears being disposed at one end of the hydrostatic transmission.

In carrying out the foregoing, the mechanical differential has a carrier mounting a pair of intermeshing pinion gears and a pair of ring gears associated one with each of the pinion gears. One of the ring gears is gearingly connected to the generator for driving thereof, while the other ring gear is connected to one of the hydrostatic transmission units and said carrier has external gear teeth which mesh with the other gear associated with the hydrostatic transmission and with the external gear teeth of the carrier being located between the pair of ring gears of the differential.

With the foregoing construction, all of the gearing structure can be located at the top of the housing of the system and the structure can be mounted vertically, thus having the gears away from the sump of the unit and avoiding oil churning losses for best efficiency of operation.

An additional feature of the structure is the positioning of the components which enables use of multiple hydrostatic transmissions and which nests the structure adjacent an end of the housing therefor, whereby the components can be positioned close to a mounting pad for the housing to minimize structural loading with resulting weight reduction.

More particularly, past systems have generally had a length in the order of 19 to 22 inches, while the system disclosed herein can have a length of approximately 13 inches, with this reduced length being critical in some uses of the system.

DESCRIPTION OF THE PREFERRED EMBODIMENT

Figure 1:
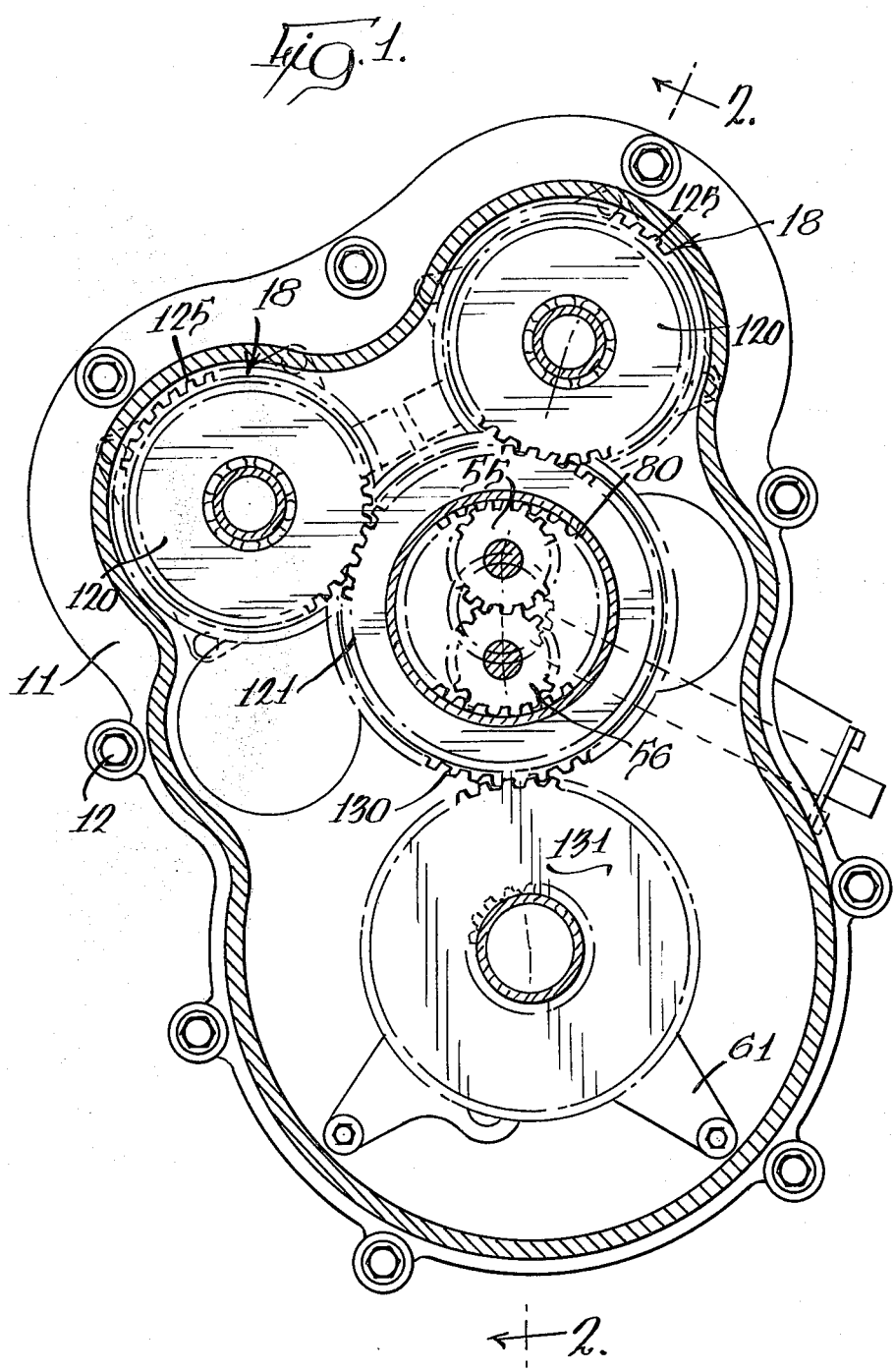
FIG. 1 is a plan section of the integrated drive-generator system, taken generally along the line 1—1 in FIG. 2.

The integrated drive-generator system has a housing, indicated generally at 10, with an enclosing top cover 11 secured thereto, as by a series of fastening devices 12.

Components of the system include an electrical generator, indicated generally at 15, which is to be operated at a constant speed by means of a drive applied to a drive input shaft 16. The drive does not go directly to the generator, since the speed of the input shaft 16 may vary, dependent upon the speed of the prime mover, such as an aircraft engine to which the system is connected.

The system includes a mechanical differential, indicated generally at 17, and a variable speed transmission, indicated generally at 18 and which is preferably in the form of a hydrostatic transmission.

The generator 15 has a pair of stators 20 and 21 associated with rotors 22 and 23 and which have electrical windings associated therewith. The rotors 22 and 23 are mounted on a shaft 25 which has a pair of bearings 26 and 27 positioned at opposite ends thereof and supported within the housing 10 whereby the rotors are mounted for rotation relative to the stators.

The drive input shaft 16 receives its drive from a connecting shaft 30 having a splined section 31 located externally of the housing 10 for connection to an output drive from a prime mover, such as an aircraft engine. Rotation of shaft 30 is imparted to the drive input shaft 16 through a quick-disconnect structure, indicated generally at 35 and which is of a type known in the art and shown in a number of patents owned by the assignee of this application.

Figure 2:
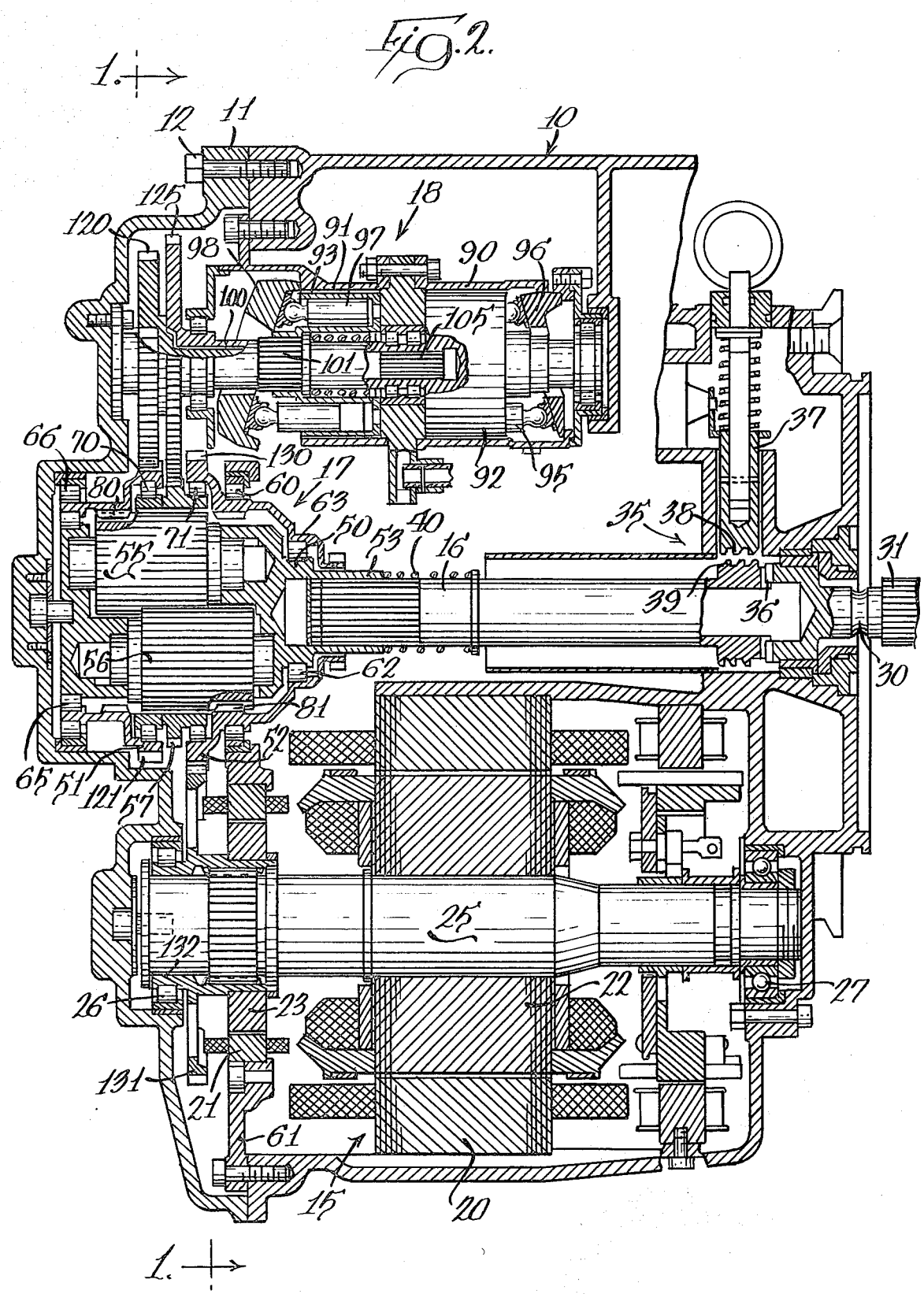
FIG. 2 is a vertical section on a slightly enlarged scale, taken generally along the line 2—2 in FIG. 1.

Generally, the quick-disconnect structure includes a disconnectable clutch 36 between the drive input shaft 16 and the shaft 30 and a quick-disconnect operator 37 which may be moved from the position shown in FIG. 2 toward the axis of the drive input shaft to cause engagement between gear teeth 38 and 39 and which causes movement of the drive input shaft 16 toward the left, as viewed in FIG. 2, against the action of a spring 40 to release clutch 36 which stops the drive of the drive input shaft 16. A quick-disconnect structure of this type is shown in Gantzer U.S. Pat. No. 3,365,981 and the disclosure thereof is incorporated herein by reference.

The mechanical differential has a carrier 50 and a pair of annular spaced-apart ring gears 51 and 52. The carrier 50 has a tubular end 53 with an internal spline relation with an end of the drive input shaft 16 permitting axial movement of the drive input shaft while maintaining a drive relation thereof to the carrier. The carrier rotatably mounts a pair of intermeshing pinion gears 55 and 56 which are associated, one with each of the ring gears 51 and 52, respectively. Additionally, the carrier has a series of external gear teeth 57 positioned in the space between the ring gears 51 and 52.

The components of the mechanical differential are supported relative to the housing and each other by a series of bearings, including a bearing 60 surrounding the ring gear 52 and supported by an internal frame member 61 which is secured to the housing 10. A bearing 62 is interposed between a cylindrical section 63 of the ring gear 52 and the carrier 50 for support of the carrier at one end thereof. The carrier extends to the opposite end of the differential and has a bearing 65 interposed between it and a cylindrical end of the ring gear 51. An additional bearing 66 surrounds the cylindrical end of the last-mentioned ring gear and is supported by a cylindrical section of the cover 11. Additional bearings 70 and 71 are positioned between the interior surfaces of the ring gears 51 and 52 and the exterior surface of the carrier 50 and immediately to either side of the external teeth 57 on the carrier.

The pinion gear 55 meshes with internal gear teeth 80 on the ring gear 51 and the mesh between ring gear 52 and pinion gear 56 is by internal teeth 81 on the ring gear 52.

The variable speed transmission 18 is shown as a hydrostatic transmission having hydraulically-connected coaxial units. These units are axial piston units and one unit is fixed displacement motor 90 while the other unit is a variable displacement pump 91. Each of the units is of the same basic structure, including rotatable cylinders 92 and 93, respectively, in which pistons reciprocate under the control of a swash plate.

The motor 90 has pistons 95 under the control of a swash plate 96 which is at a fixed angle while the pump 91 has pistons 97 whose stroke is controlled by a swash plate 98 which is mounted to have its angle varied by control structure, not shown, but which is well known in the art. The cylinder 93 of the pump 91 is driven through an element of the mechanical differential which is connected to a tubular quill shaft 100 which is splined to the cylinder 93, as shown at 101. The fixed displacement motor 90 drives an element of the differential through a shaft 105 which is splined to the cylinder 92 of the motor and which extends through the tubular quill shaft 100 to a point of drive connection to the mechanical differential.

The mechanical differential has two drive input connections and two drive output connections. The first drive input connection is that of the carrier 50 to the drive input shaft 16. The second drive input connection is from the fixed displacement unit 90 of the hydrostatic transmission by rotation of the shaft 105 which has a gear 120 which meshes with teeth of an external gear 121 on the ring gear 51. The first drive output connection from the mechanical differential is from the external gear teeth 57 on the carrier which mesh with a gear 125 on the tubular quill shaft 100 to provide a direct input from the input drive shaft 16 to the variable speed unit 91. The second drive output connection is from the ring gear 52 which has an external gear 130 which meshes with a gear 131 carried by a member 132 which is internally splined to the rotor shaft 25 of the generator 15.

With the disclosed structure, the speed of drive input shaft 16 can be monitored and, as necessary, the displacement of the variable displacement unit 91 varied whereby there is a constant speed of rotation of the ring gear 52 to provide a constant speed drive of the rotors of the generator 15. The structure for monitoring the input speed and controlling the hydrostatic transmission is well known in the art and does not form a part of the present invention.

The structural arrangement disclosed herein enables placement of both the variable speed transmission and the generator alongside the drive input shaft 16 and the mechanical differential 17. As shown in FIG. 1, it is thus possible to have two of the transmission units 18 associated with the mechanical differential whereby each of the transmission can be of a smaller size for more efficient operation. Location of the gears 120 and 125 associated with the hydrostatic transmission at one end thereof enables the use of a relatively short mechanical differential, with its length determined by only the necessary gear and bearing span requirements. Resultingly, there is a short length integrated drive-generator system which requires smaller space for installation and which results in lighter weight. All of the motion-transmitting gearing lies in a relatively narrow gear plane which can be located at the top of the unit for minimizing losses due to churning of lubricating and cooling coil. Also, all components are positioned close to the mounting pad for the structure of the system to minimize structural loading which also results in weight reduction because of reduced structural loading, both within the housing as well as on the supporting structure for the system.

We claim:

1. An integrated drive-generator system comprising, a housing mounting a drive input shaft, a variable speed transmission, a generator spaced from and in nonaligned relation with the transmission and a mechanical differential positioned adjacent the transmission and the generator, said mechanical differential having a first drive input connection to said drive input shaft, a second drive input connection to the transmission, a first drive output connection to said transmission and a second drive output connection to the generator, both of said drive connections to the transmission being at one end thereof and in generally coplanar relation with the mechanical differential and said drive output connection to the generator.

2. An integrated drive-generator system as defined in claim 1 wherein said variable speed transmission is a hydrostatic transmission.

3. An integrated drive-generator system as defined in claim 2 wherein said hydrostatic transmission has a pair of hydraulically-connected coaxial units with one unit having a variable displacement and connected to said first drive output connection and the other of said units is connected to said second drive input connection.

4. An integrated drive-generator system as defined in claim 3 wherein each of said units has a separate rotatable shaft associated therewith and with one of the shafts being tubular to have the other shaft positioned therein in coaxial relation.

5. An integrated drive-generator system as defined in claim 1 wherein said mechanical differential has a carrier with intermeshing pinion gears and a pair of ring gears associated with said pinion gears, said carrier being connected to the drive input shaft to define said first drive input connection and geared to said transmission to define said first drive output connection, one of said ring gears being geared to said transmission to define said second input drive connection, and the other ring gear being geared to said generator to define the second output drive connection.

6. An integrated drive-generator system comprising a drive input shaft, a mechanical differential positioned in coaxial relation with said drive input shaft for driving thereby, a generator positioned alongside said differential and drive input shaft, a hydrostatic transmission positioned alongside said differential and drive input shaft and circumferentially spaced from said generator and having a pair of units, a pair of shafts connected one to each unit and with one shaft being tubular to receive the other shaft therein, a pair of adjacent gears associated one with each of said shafts, a pair of elements of the mechanical differential geared one to each of said adjacent gears, and another element of the mechanical differential adjacent said pair of elements geared to the generator.

7. An integrated drive-generator system as defined in claim 6 wherein there are a pair of hydrostatic transmissions alongside said differential and drive input shaft and which are geared to said differential.

8. An integrated drive-generator system which is compact and of minimum weight comprising a hydrostatic transmission having a pair of units with coaxial drive shafts connected one to each and each shaft having a gear with the gears being adjacent to each other, a generator and a mechanical differential having a carrier with an external gear, a plurality of intermeshing pinion gears, and a pair of ring gears each with an external gear, all of said external gears lying closely adjacent to each other, a drive connection between one ring gear and the generator, a drive connection between the other ring gear and one of the transmission shaft gears, and drive connections from the drive input shaft to said carrier and therethrough to the other of the transmission shaft gears.

9. An integrated drive-generator system comprising: a housing; a drive shaft rotatably mounted in said housing; a mechanical differential in coaxial relation with said drive shaft and having a carrier with external gear teeth and which rotatably mounts intermeshing pinion gears, and a pair of ring gears each having external gear teeth and positioned to either side of said carrier gear teeth and geared by internal teeth one to each of said pinion gears; a hydrostatic transmission having a fixed displacement unit and a variable displacement unit coaxial therewith and located alongside said drive shaft, a first shaft connected to the fixed displacement unit, a quill shaft connected to the variable displacement unit and surrounding the first shaft, a pair of gears connected one to the quill shaft and the other to said first shaft and positioned adjacent each other with the one gear geared to said carrier and the other gear geared to one of said ring gears; and a generator positioned alongside said drive shaft circumferentially of said hydrostatic transmission and having an input shaft with a gear which is geared to the other of said ring gears, said ring and carrier gears and the gears geared thereto being in a generally planar relation.

10. An integrated drive-generator system comprising, a drive input shaft, a mechanical differential in coaxial relation with said drive input shaft and having a carrier with external gear teeth and which rotatably mounts intermeshing pinion gears, a pair of ring gears associated with different ones of said pinion gears, a hydrostatic transmission having a fixed displacement unit and a variable displacement unit coaxial therewith and located alongisde said drive shaft, a first shaft and a surrounding tubular quill shaft connected one to the fixed displacement unit and the other to the variable displacement unit, said first shaft and quill shaft being geared one to said carrier and the other to one of said ring gears, and a generator positioned alongside said drive shaft circumferentially of said hydrostatic transmission and having an input shaft which is geared to the other of said ring gears.

11. An integrated drive-generator system comprising, a drive input shaft, a hydrostatic transmission having a pair of hydraulically-connected coaxial units each having a drive connection at one end of the transmission, a generator spaced from and in nonaligned relation with the transmission and a mechanical differential positioned between the transmission and the generator, said mechanical differential having a first drive input connection to said drive input shaft, a second drive input connection to the transmission, a first drive output connection to said transmission and a second drive output connection to the generator, said drive connections to the transmission being in generally coplanar relation with said drive output connection to the generator.

* * * * *